US012315423B2

(12) United States Patent
Park et al.

(10) Patent No.: US 12,315,423 B2
(45) Date of Patent: May 27, 2025

(54) DISPLAY APPARATUS DRIVING PANEL BASED ON SCALE FACTOR AND METHOD USING THE SAME

(71) Applicant: Samsung Display Co., Ltd., Yongin-si (KR)

(72) Inventors: Sungjae Park, Seongnam-si (KR); Seunghwan Park, Anyang-si (KR); Namjae Lim, Yongin-si (KR); Youngwoon Choi, Seoul (KR); Seungho Park, Suwon-si (KR); Jinho Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/990,130

(22) Filed: Nov. 18, 2022

(65) Prior Publication Data

US 2023/0154382 A1 May 18, 2023

(30) Foreign Application Priority Data

Nov. 18, 2021 (KR) ........................ 10-2021-0159633

(51) Int. Cl.
*G09G 3/20* (2006.01)

(52) U.S. Cl.
CPC ... *G09G 3/2096* (2013.01); *G09G 2300/0819* (2013.01); *G09G 2310/0232* (2013.01); *G09G 2310/0275* (2013.01); *G09G 2320/0626* (2013.01); *G09G 2330/021* (2013.01); *G09G 2330/04* (2013.01)

(58) Field of Classification Search
CPC .................................................... G09G 3/2096
See application file for complete search history.

(56) References Cited

U.S. PATENT DOCUMENTS

2018/0014011 A1* 1/2018 He ........................ H04N 19/593

FOREIGN PATENT DOCUMENTS

| | | | |
|---|---|---|---|
| KR | 1020140093093 | A | 5/2019 |
| KR | 102042533 | B1 | 11/2019 |
| KR | 102083299 | B1 | 3/2020 |

OTHER PUBLICATIONS

KR20140093093 (A) Jul. 25, 2014 machine translation for convenience (Year: 2024).*

KR102042533B1 Nov. 27, 2019 machine translation for convenience (Year: 2024).*

* cited by examiner

*Primary Examiner* — Gustavo Polo
(74) *Attorney, Agent, or Firm* — CANTOR COLBURN LLP

(57) ABSTRACT

A display apparatus includes a display panel, a driving controller and a data driver. The driving controller divides input image data into a plurality of partial image data corresponding to a plurality of display areas of the display panel, calculates local loads corresponding to the plurality of partial image data, determines a scale factor based on the local loads, and applies the scale factor to the input image data to generate a data signal. The data driver converts the data signal to a data voltage and outputs the data voltage to the display panel. The scale factor for a center display area corresponding to a center of the display panel among the plurality of display areas is determined differently from the scale factor for an edge display area corresponding to an edge of the display panel among the plurality of display areas.

21 Claims, 12 Drawing Sheets

DISPLAY APPARATUS DRIVING PANEL BASED ON SCALE FACTOR AND METHOD USING THE SAME

This application claims priority to Korean Patent Application No. 10-2021-0159633, filed on Nov. 18, 2021, and all the benefits accruing therefrom under 35 U.S.C. § 119, the content of which in its entirety is herein incorporated by reference.

BACKGROUND

1. Field

Embodiments of the invention relate to a display apparatus and a method of driving a display panel using the display apparatus. More particularly, embodiments of the invention relate to a display apparatus dividing a display panel in a plurality of display areas and determining a scale factor based on a local load corresponding to the display area and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

SUMMARY

When a luminance of the display panel is not adjusted according to a load of input image data, an overcurrent may flow in the data driver or the display panel so that the data driver or the display panel may be damaged.

When the input image data include a locally bright portion and the luminance of the display panel is adjusted based on an entire load of the input image data, the luminance adjustment may not be applied for the input image data including the locally bright portion. Thus, an overcurrent may flow in a data driving chip or the display panel corresponding to the locally bright portion so that the data driving chip or the display panel may be damaged.

Embodiments of the invention provide a display apparatus dividing a display panel in a plurality of display areas and determining a scale factor based on a local load corresponding to the plurality of display area.

Embodiments of the invention also provide a method of driving a display panel using the display apparatus.

In an embodiment of a display apparatus according to the invention, the display apparatus includes a display panel, a driving controller and a data driver. The driving controller divides input image data into a plurality of partial image data corresponding to a plurality of display areas of the display panel, calculates local loads corresponding to the plurality of partial image data, determines a scale factor based on the local loads, applies the scale factor to the input image data and generates a data signal. The data driver converts the data signal to a data voltage and outputs the data voltage to the display panel. The scale factor for a center display area corresponding to a center of the display panel among the plurality of display areas is determined differently from the scale factor for an edge display area corresponding to an edge of the display panel among the plurality of display areas.

In an embodiment, the driving controller may include an image divider which divides the input image data into the plurality of partial image data, a local load calculator which calculates the local loads corresponding to the plurality of partial image data and a scale factor determiner which determines the scale factor based on a maximum value among the local loads. The scale factor may be applied to an entirety of the input image data.

In an embodiment, a time duration of applying the scale factor, which is generated when an edge local load of the edge display area exceeds a threshold value, to the input image data may be shorter than a time duration of applying the scale factor, which is generated when a center local load of the center display area exceeds the threshold value, to the input image data.

In an embodiment, an edge scale factor, which is generated when an edge local load of the edge display area exceeds a threshold value, to the input image data may be less than a center scale factor, which is generated when a center local load of the center display area exceeds the threshold value, to the input image data.

In an embodiment, when the center local load is equal to or less than the threshold value, the center scale factor may be one. When the center local load is greater than the threshold value, the center scale factor may be a first value less than one. When the edge local load is equal to or less than the threshold value, the edge scale factor may be one. When the edge local load is greater than the threshold value, the edge scale factor may be a second value less than the first value.

In an embodiment, when the center local load is equal to or less than a first threshold value, the center scale factor may be one. When the center local load is greater than the first threshold value and equal to or less than a second threshold value, the center scale factor may be between one and a first value less than one. When the center local load is greater than the second threshold value, the center scale factor may be the first value. When the edge local load is equal to or less than the first threshold value, the edge scale factor may be one. When the edge local load is greater than the first threshold value and equal to or less than the second threshold value, the edge scale factor may be between one and a second value less than the first value. When the edge local load is greater than the second threshold value, the edge scale factor may be the second value.

In an embodiment, when an edge local load corresponding to the edge display area exceeds an edge threshold value, an edge scale factor may be determined to be less than one. When a center local load corresponding to the center display area exceeds a center threshold value, a center scale factor may be determined to be less than one. The edge threshold value may be less than the center threshold value.

In an embodiment, when the center local load is equal to or less than the center threshold value, the center scale factor may be one. When the center local load is greater than the center threshold value, the center scale factor may be a first value less than one. When the edge local load is equal to or less than the edge threshold value, the edge scale factor may be one. When the edge local load is greater than the edge threshold value, the edge scale factor may be the first value.

In an embodiment, when the center local load is equal to or less than a first center threshold value, the center scale factor may be one. When the center local load is greater than the first center threshold value and equal to or less than a second center threshold value, the center scale factor may be between one and a first value less than one. When the center local load is greater than the second center threshold value, the center scale factor may be the first value. When the edge local load is equal to or less than a first edge threshold value, the edge scale factor may be one. When the edge local load is greater than the first edge threshold value and equal to or less than a second edge threshold value, the edge scale factor may be between one and the first value. When the edge local load is greater than the second edge threshold value, the edge scale factor may be the first value. The first edge threshold value may be less than the first center threshold value. The second edge threshold value may be less than the second center threshold value.

In an embodiment, when a local load of the local loads changes from below an enter threshold value to above the enter threshold value, the display apparatus may enter a local net power operation. When the local load changes from above an exit threshold value to below the exit threshold value, the display apparatus may exit the local net power operation. The enter threshold value may be different from the exit threshold value.

In an embodiment, the exit threshold value may be equal to or less than a half of the enter threshold value.

In an embodiment of a display apparatus according to the invention, the display apparatus includes a display panel, a driving controller and a data driver. The driving controller includes a first net power controller which determines a first scale factor based on a total load of input image data and a second net power controller which divides the input image data into a plurality of partial image data corresponding to a plurality of display areas of the display panel, calculates local loads corresponding to the plurality of partial image data, and determines a second scale factor based on the local loads. The driving controller applies the first scale factor and the second scale factor to the input image data to generate a data signal. The data driver converts the data signal to a data voltage and outputs the data voltage to the display panel.

In an embodiment, the first net power controller may include a first load calculator which calculates the total load of the input image data and a first scale factor determiner which determines the first scale factor based on the total load.

In an embodiment, the second net power controller may include an image divider which divides the input image data into the plurality of partial image data, a local load calculator which calculates the local loads corresponding to the plurality of partial image data and a second scale factor determiner which determines the second scale factor based on a maximum value among the local loads.

In an embodiment, the driving controller may apply a minimum value of the first scale factor and the second scale factor to the input image data.

In an embodiment, the driving controller may apply a multiplication of the first scale factor and the second scale factor to the input image data.

In an embodiment, the driving controller may further include a screen saver which compares a previous frame image and a current frame image to determine whether a same image is repeated for a time duration equal to or greater than a predetermined threshold time duration, and generates a third scale factor for reducing a luminance of the input image data when the same image is repeated for the time duration equal to or greater than the predetermined threshold time duration.

In an embodiment, the screen saver may receive a local net power operation flag signal from the second net power controller. When the local net power operation flag signal is activated, the screen saver may generate the third scale factor which reduces the luminance of the input image data earlier than an end time point of the predetermined threshold time duration.

In an embodiment of a method of driving a display panel according to the invention, the method includes determining a first scale factor based on a total load of input image data, dividing the input image data into a plurality of partial image data corresponding to a plurality of display areas of a display panel, calculating local loads corresponding to the plurality of partial image data, determining a second scale factor based on the local loads, applying the first scale factor and the second scale factor to the input image data to generate a data signal, converting the data signal to a data voltage and outputting the data voltage to the display panel.

In an embodiment, the second scale factor may be generated based on a maximum value among the local loads.

In an embodiment, the method may further include comparing a previous frame image and a current frame image to determine whether a same image is repeated for a time duration equal to or greater than a predetermined threshold time duration and generating a third scale factor for reducing a luminance of the input image data when the same image is repeated for the time duration equal to or greater than the predetermined threshold time duration.

In an embodiment, an operation of the determining the second scale factor for a center display area corresponding to a center of the display panel among the plurality of display areas may be different from an operation of the determining the second scale factor for an edge display area corresponding to an edge of the display panel among the plurality of display areas.

According to the display apparatus and the method of driving the display panel, the display panel is divided into the plurality of display areas and the scale factor is determined according to the local loads corresponding to the plurality of display areas. Thus, even when the input image data include the locally bright portion, the overcurrent flowing in the data driver or the display panel may be prevented.

The method of determining the scale factor may be different for the center display area corresponding to the center of the display panel and the edge display area corresponding to the edge of the display panel so that the edge display area and the data driving chip corresponding to the edge display area which are relatively likely to be overheated may be effectively protected.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
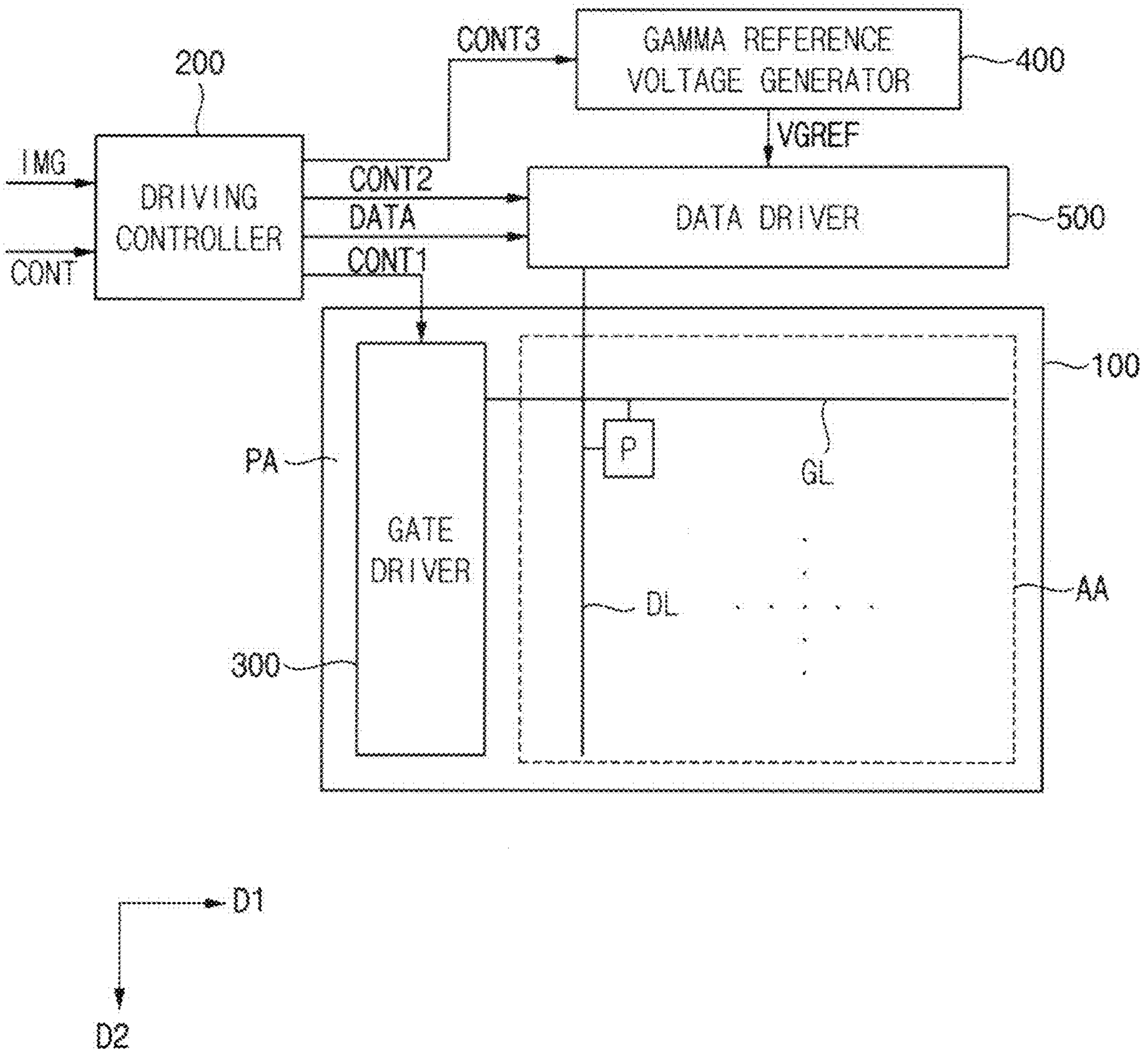
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400 and a data driver 500.

In an embodiment, the driving controller 200 and the data driver 500 may be unitarily integrated, for example. In an embodiment, the driving controller 200, the gamma reference voltage generator 400 and the data driver 500 may be unitarily integrated, for example. A driving module including at least the driving controller 200 and the data driver 500 which are unitarily integrated may be referred to as to a timing controller embedded data driver ("TED").

The display panel 100 has a display region AA on which an image is displayed and a peripheral region PA adjacent to the display region AA.

The display panel 100 includes a plurality of gate lines GL, a plurality of data lines DL and a plurality of pixels P connected to corresponding gate lines of the plurality of gate lines GL and corresponding data lines of the plurality of data lines DL. The gate lines GL may extend in a first direction D1 and the data lines DL may extend in a second direction D2 crossing the first direction D1.

The driving controller 200 receives input image data IMG and an input control signal CONT from an external apparatus. In an embodiment, the input image data IMG may include red image data, green image data and blue image data. In an embodiment, the input image data IMG may include white image data. In an embodiment, the input image data IMG may include magenta image data, yellow image data and cyan image data. However, the invention is not limited thereto, and input image data IMG may include various other color data. The input control signal CONT may include a master clock signal and a data enable signal. In an embodiment, the input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 2 to 15 in detail.

The gate driver 300 generates gate signals driving the gate lines GL in response to the first control signal CONT1 received from the driving controller 200. The gate driver 300 outputs the gate signals to the gate lines GL. In an embodiment, the gate driver 300 may sequentially output the gate signals to the gate lines GL, for example. In an embodiment, the gate driver 300 may be disposed (e.g., mounted) on the peripheral region of the display panel 100, for example. In an embodiment, the gate driver 300 may be integrated on the peripheral region of the display panel 100, for example.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
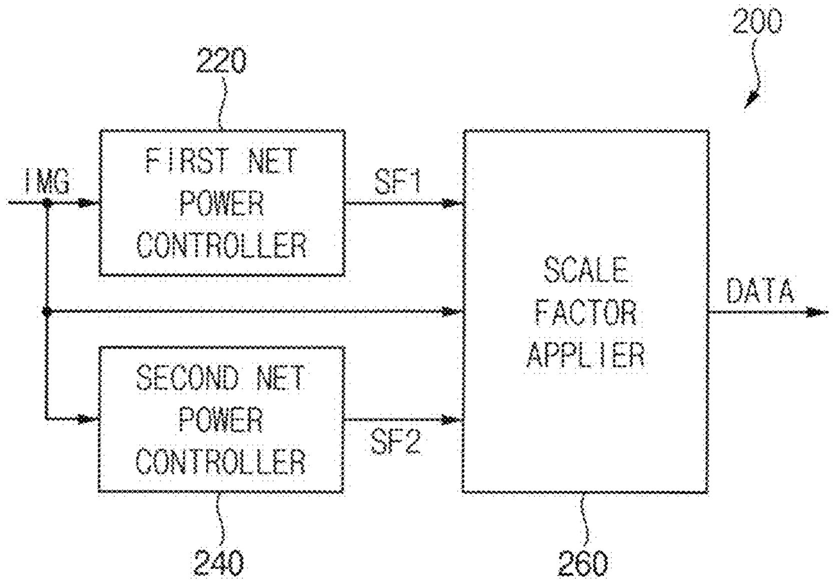
FIG. 2 is a block diagram illustrating a driving controller of FIG. 1.

FIG. 2 is a block diagram illustrating the driving controller 200 of FIG. 1.

Referring to FIGS. 1 and 2, the driving controller 200 may include a first net power controller 220, a second net power controller 240 and a scale factor applier 260.

The first net power controller 220 may determine a first scale factor SF1 based on a total load of the input image data IMG. The first net power controller 220 may output the first scale factor SF1 to the scale factor applier 260.

The second net power controller 240 may divide the input image data IMG into a plurality of partial image data corresponding to a plurality of display areas of the display panel 100, may calculate local loads corresponding to the plurality of partial image data and may determine a second scale factor SF2 based on the local loads. The second net power controller 240 may output the second scale factor SF2 to the scale factor applier 260.

The scale factor applier 260 may apply the first scale factor SF1 and the second scale factor SF2 to the input image data IMG to generate the luminance compensated data signal DATA.

In an embodiment, the scale factor applier 260 may apply a minimum value of the first scale factor SF1 and the second scale factor SF2 to the input image data IMG, for example. In an embodiment, when the first scale factor SF1 determined based on the total load is 0.7 and the second scale factor SF2 determined based on the local load is 0.9, the scale factor applier 260 may apply 0.7 which is the minimum value of 0.7 and 0.9 to the input image data IMG, for example. When a grayscale value of the input image data IMG is 200 and the scale factor of 0.7 is applied to the input image data IMG, the data signal may be generated corresponding to a grayscale value of 140.

In an alternative embodiment, the scale factor applier 260 may apply a multiplication of the first scale factor SF1 and the second scale factor SF2 to the input image data IMG. In an embodiment, when the first scale factor SF1 determined based on the total load is 0.7 and the second scale factor SF2 determined based on the local load is 0.9, the scale factor applier 260 may apply 0.63 which is the multiplication of 0.7 and 0.9 to the input image data IMG, for example. When a grayscale value of the input image data IMG is 200 and the scale factor of 0.63 is applied to the input image data IMG, the data signal may be generated corresponding to a grayscale value of 126.

In an embodiment, a minimum value of the first scale factor SF1 determined by the first net power controller 220 based on the total load may be less than a minimum value of the second scale factor SF2 determined by the second net power controller 240 based on the local loads, for example. In an alternative embodiment, the minimum value of the first scale factor SF1 determined by the first net power controller 220 based on the total load may be equal to the minimum value of the second scale factor SF2 determined by the second net power controller 240 based on the local loads.

The first scale factor SF1 determined based on the total load may be applied to an entirety of the input image data IMG. The second scale factor SF2 determined based on the local loads may be applied not to the input image data IMG of a corresponding display area but to the entirety of the input image data IMG.

Figure 3:
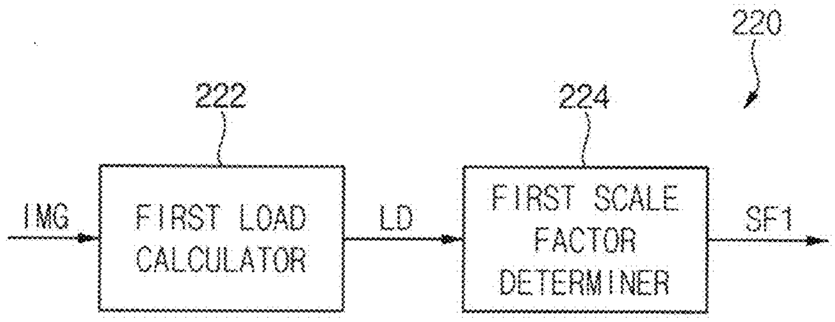
FIG. 3 is a block diagram illustrating a first net power controller of FIG. 2.
Figure 4:
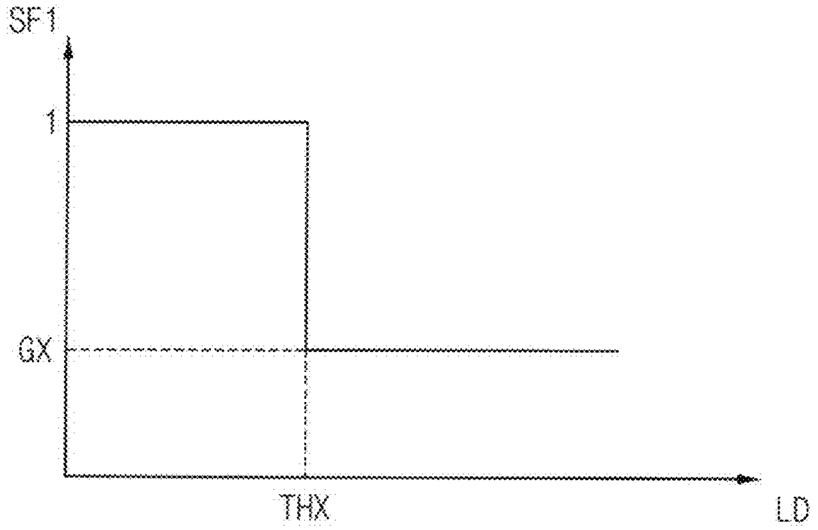
FIG. 4 is a graph illustrating an embodiment of an operation of a first scale factor determiner of FIG. 3.
Figure 5:
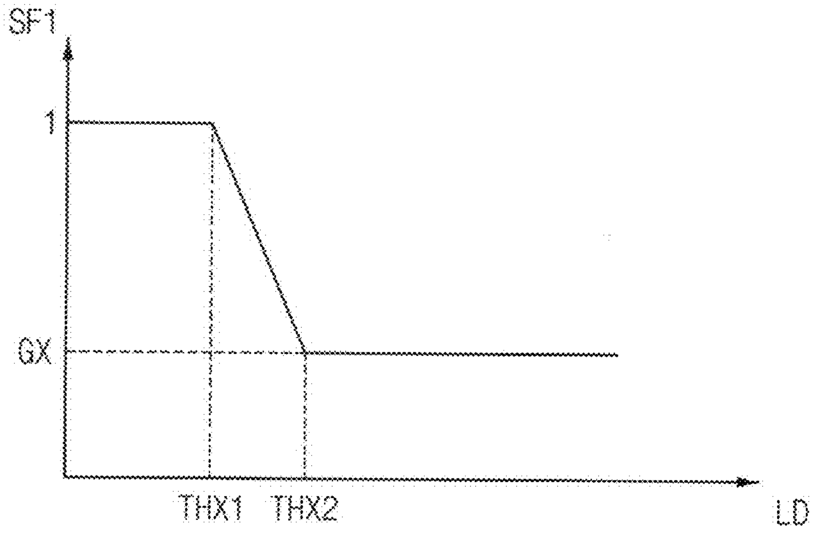
FIG. 5 is a graph illustrating an embodiment of an operation of the first scale factor determiner of FIG. 3.

FIG. 3 is a block diagram illustrating the first net power controller 220 of FIG. 2. FIG. 4 is a graph illustrating an embodiment of an operation of a first scale factor determiner 224 of FIG. 3. FIG. 5 is a graph illustrating an embodiment of an operation of the first scale factor determiner 224 of FIG. 3.

Referring to FIGS. 1 to 5, the first net power controller 220 may include a first load calculator 222 and a first scale factor determiner 224.

The first load calculator 222 may receive the input image data IMG. The first load calculator 222 may calculate a total load LD of the input image data IMG. The first load calculator 222 may output the total load LD to the first scale factor determiner 224.

The first scale factor determiner 224 may determine the first scale factor SF1 based on the total load LD received from the first load calculator 222.

In an embodiment, when the total load LD is relatively little, the first scale factor SF1 may be one, for example. When the first scale factor SF1 is one, it may mean that the grayscale value of the input image data IMG is not compensated. In an embodiment, when the total load LD is relatively great, the first scale factor SF1 may be less than one, for example. When the first scale factor SF1 is less than one, it may mean that the grayscale value of the input image data IMG is reduced.

In an embodiment of FIG. 4, the first scale factor SF1 may be set based on one threshold value THX, for example. As shown in FIG. 4, when the total load LD is equal to or less than the threshold value THX, the first scale factor SF1 may be one. When the total load LD is greater than the threshold value THX, the first scale factor SF1 may be determined to a value GX which is less than one.

In an embodiment of FIG. 5, the first scale factor SF1 may be set based on two threshold values THX1 and THX2, for example. As shown in FIG. 5, when the total load LD is equal to or less than a first threshold value THX1, the first scale factor SF1 may be one. When the total load LD is greater than the first threshold value THX1 and equal to or less than a second threshold value THX2, the first scale factor SF1 may be determined to a value between one and the value GX. When the total load LD is greater than the second threshold value THX2, the second scale factor SF2 may be determined to the value GX.

Figure 6:
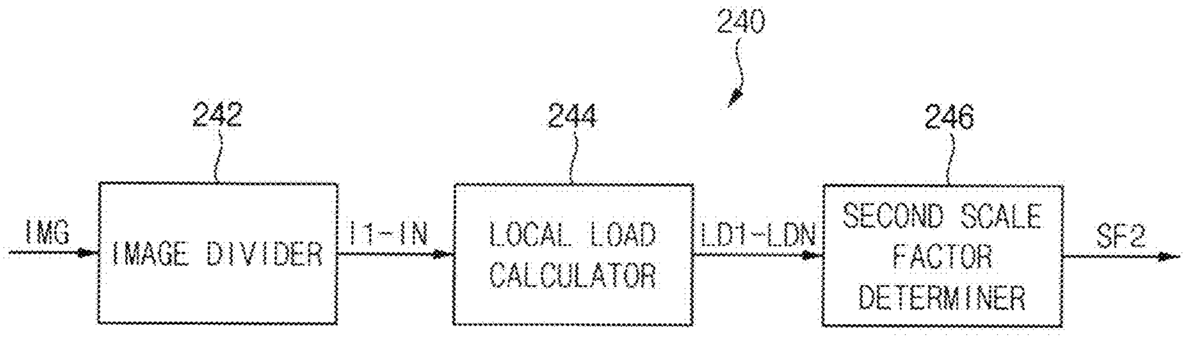
FIG. 6 is a block diagram illustrating a second net power controller of FIG. 2.
Figure 7:
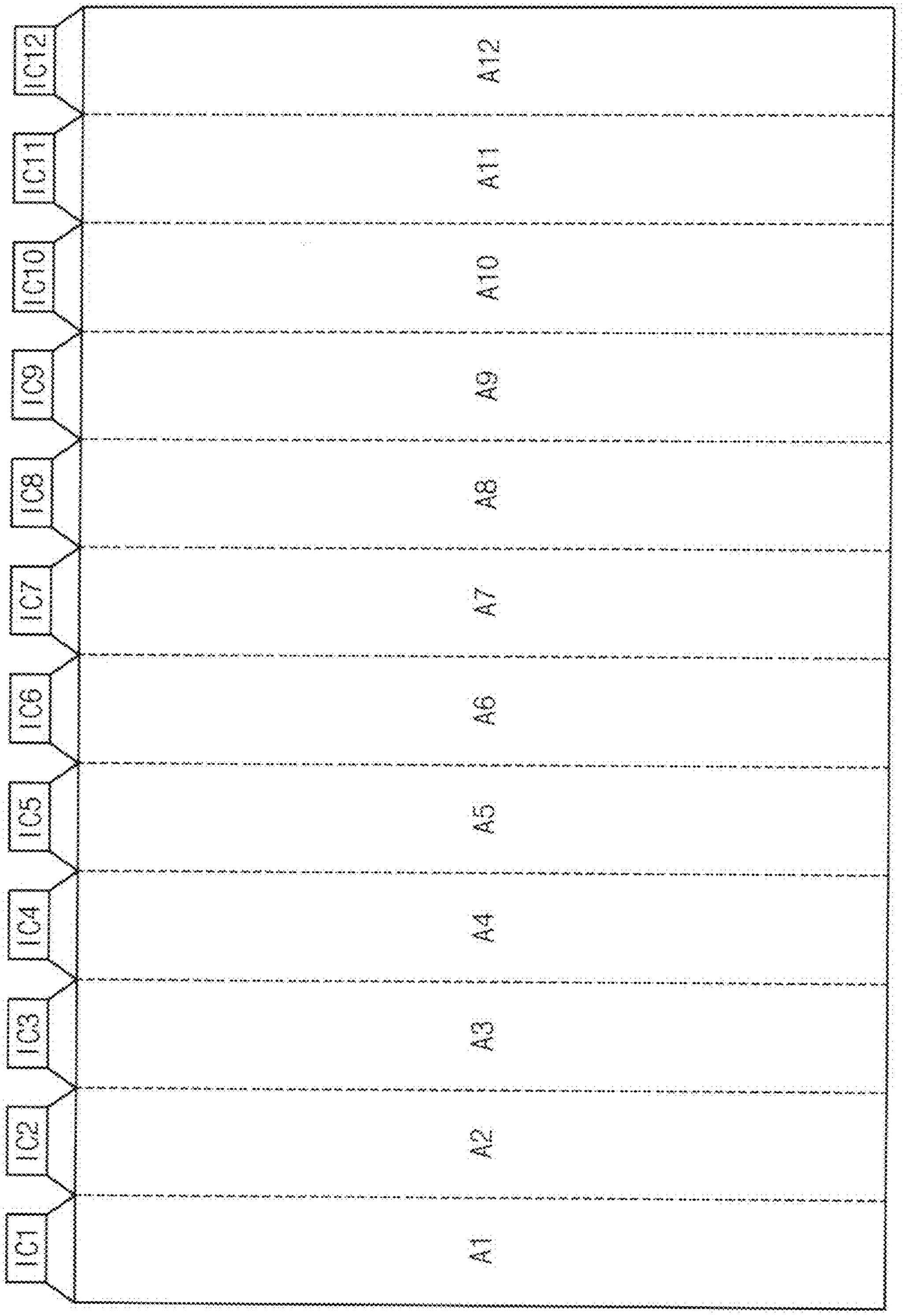
FIG. 7 is a conceptual diagram illustrating display areas of the display panel of FIG. 1 and data driving chips of a data driver of FIG. 1 corresponding to the display areas.
Figure 8:
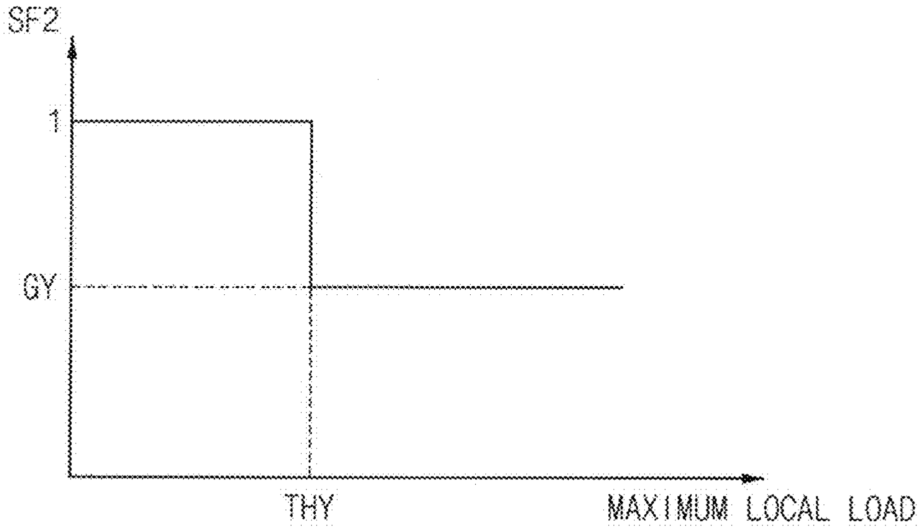
FIG. 8 is a graph illustrating an embodiment of an operation of a second scale factor determiner of FIG. 6.
Figure 9:
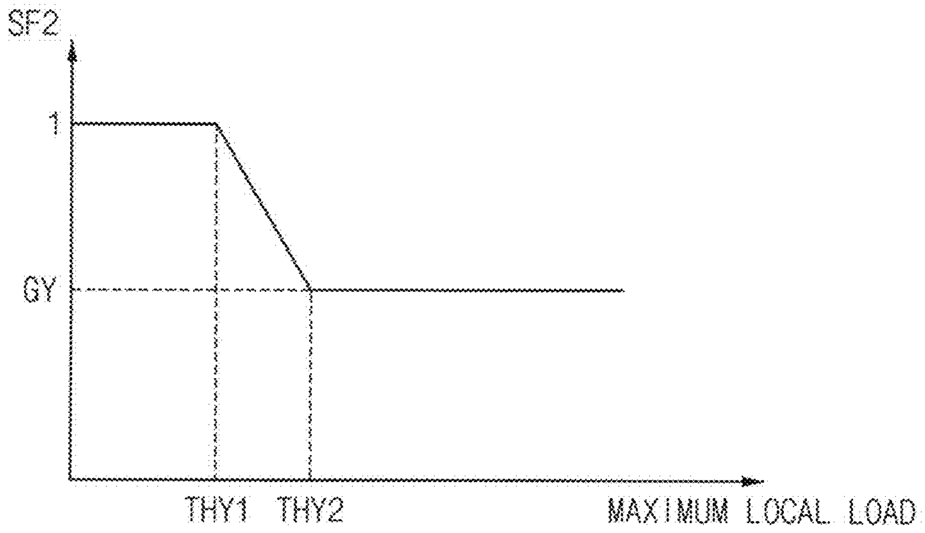
FIG. 9 is a graph illustrating an embodiment of an operation of the second scale factor determiner of FIG. 6.

FIG. 6 is a block diagram illustrating the second net power controller 240 of FIG. 2. FIG. 7 is a conceptual diagram illustrating display areas A1 to A12 of the display panel 100 of FIG. 1 and data driving chips IC1 to IC12 of the data driver 500 of FIG. 1 corresponding to the display areas A1 to A12. FIG. 8 is a graph illustrating an embodiment of an operation of a second scale factor determiner 246 of FIG. 6. FIG. 9 is a graph illustrating an embodiment of an operation of the second scale factor determiner 246 of FIG. 6.

Referring to FIGS. 1 to 9, the second net power controller 240 may include an image divider 242, a local load calculator 244 and a second scale factor determiner 246.

The image divider 242 may receive the input image data IMG. The image divider 242 may divide the input image data IMG into a plurality of partial image data I1 to IN corresponding to the display areas (e.g. A1 to A12 of FIG. 7) of the display panel 100. The image divider 242 may output the partial image data I1 to IN to the local load calculator 244. In FIG. 6, the number of the display areas is N and the number of the partial image data corresponding to the partial image data I1 to IN is N, for example. Herein, N is a natural number equal to or greater than two.

In FIG. 7, the display panel 100 includes twelve display areas A1 to A12 and twelve data driving chips IC1 to IC12 respectively correspond to the display areas A1 to A12, for example. In this case, the image divider 242 may divide the input image data IMG into twelve partial image data corresponding to twelve display images A1 to A12 and output the twelve partial image data to the local load calculator 244. However, the invention is not limited thereto, and the number of the display areas and the number of the data driving chips may be different in other embodiments.

Although the display areas correspond to the data driving chips in a one-to-one (1:1) manner in the illustrated embodiment, the invention may not be limited thereto. In an embodiment, the display areas may correspond to the data driving chips in a many-to-one manner or in a one-to-many manner, for example. In an alternative embodiment, the display area may be set independently of an area covered by the data driving chip.

The local load calculator 244 may receive the partial image data I1 to IN. The local load calculator 244 may calculate the respective local loads LD1 to LDN of the respective partial image data I1 to IN. The local load calculator 244 may output the local loads LD1 to LDN to the second scale factor determiner 246.

The second scale factor determiner 246 may determine the second scale factor SF2 based on the local loads LD1 to LDN received from the local load calculator 244. In an embodiment, the second scale factor determiner 246 may determine the second scale factor SF2 based on a maximum value (a maximum local load) of the local loads LD1 to LDN, for example.

In an embodiment, when a full white image is displayed in only one display area and black images are displayed in the other display areas, the operation of reducing the grayscale value of the input image data IMG may not be performed by the first net power controller 220 since the first net power controller 220 operates based on the total load LD, for example. However, when a full white image is displayed in only one display area, the display panel 100 of the corresponding display area displaying the full white image or the data driving chip corresponding to the display area displaying the full white image may be damaged due to overcurrent or overheating.

When a full white image is displayed in only one display area and black images are displayed in the other display areas, the operation of reducing the grayscale value of the input image data IMG may be performed by the second net power controller 240 since the second net power controller 240 operates based on the maximum value (the maximum local load) of the local loads. In an embodiment, the driving controller 200 may reduce the grayscale values of the entirety of the input image data IMG based on the local load, for example.

In an embodiment, when the maximum local load is relatively little, the second scale factor SF2 may be one, for example. When the second scale factor SF2 is one, it may mean that the grayscale value of the input image data IMG is not compensated. In an embodiment, when the maximum local load is relatively great, the second scale factor SF2 may be less than one, for example. When the second scale factor SF2 is less than one, it may mean that the grayscale value of the input image data IMG is reduced.

In an embodiment of FIG. 8, the second scale factor SF2 may be set based on one threshold value THY, for example. As shown in FIG. 8, when the maximum local load is equal to or less than the threshold value THY, the second scale factor SF2 may be one. When the maximum local load is greater than the threshold value THY, the second scale factor SF2 may be determined to a value GY which is less than one.

In an embodiment of FIG. 9, the second scale factor SF2 may be set based on two threshold values THY1 and THY2, for example. As shown in FIG. 9, when the maximum local load is equal to or less than a first threshold value THY1, the second scale factor SF2 may be one. When the maximum local load is greater than the first threshold value THY1 and equal to or less than a second threshold value THY2, the second scale factor SF2 may be determined to a value between one and the value GY. When the maximum local load is greater than the second threshold value THY2, the second scale factor SF2 may be determined to the value GY.

In an embodiment, the minimum value (e.g. GX in FIGS. 4 and 5) of the first scale factor SF1 determined by the first net power controller 220 based on the total load LD may be less than the minimum value (e.g. GY in FIGS. 8 and 9) of the second scale factor SF2 determined by the second net power controller 240 based on the local loads, for example. Since a case in which the total load LD exceeds a corresponding threshold value thereof may be more dangerous than a case in which the maximum local load exceeds a corresponding threshold value thereof, the minimum value (e.g. GX in FIGS. 4 and 5) of the first scale factor SF1 may be set to be less than the minimum value (e.g. GY in FIGS. 8 and 9) of the second scale factor SF2.

In an embodiment, the threshold value (e.g. THX in FIG. 4 and THX1 and THX2 in FIG. 5) of the total load LD may be equal to the threshold value (e.g. THY in FIG. 8 and THY1 and THY2 in FIG. 9) of the maximum local load, for example. In an alternative embodiment, e.g., the threshold value (e.g. THX in FIG. 4 and THX1 and THX2 in FIG. 5) of the total load LD may be set differently from the threshold value (e.g. THY in FIG. 8 and THY1 and THY2 in FIG. 9) of the maximum local load, for example.

Figure 10A:
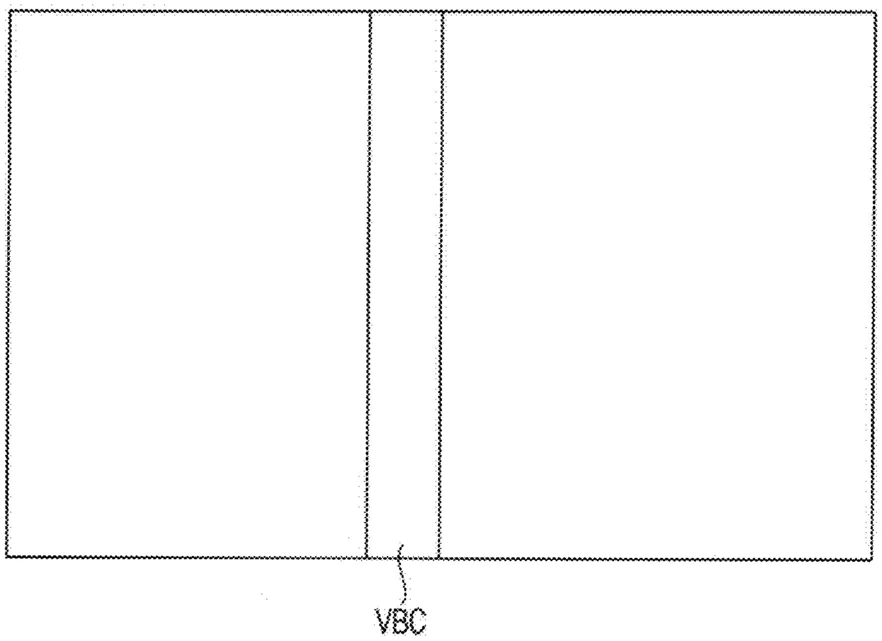
FIG. 10A is a conceptual diagram illustrating a case in which a white pattern having a vertical bar shape is displayed at a center portion of the display panel of FIG. 1.
Figure 10B:
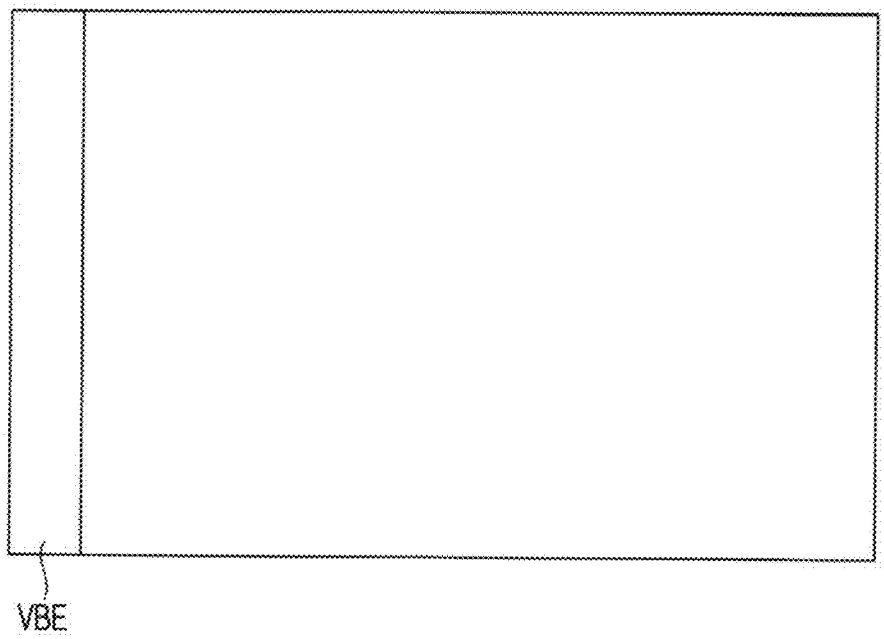
FIG. 10B is a conceptual diagram illustrating a case in which a white pattern having a vertical bar shape is displayed at an edge portion of the display panel of FIG. 1.

FIG. 10A is a conceptual diagram illustrating a case in which a white pattern VBC having a vertical bar shape is displayed at a center portion of the display panel 100 of FIG. 1. FIG. 10B is a conceptual diagram illustrating a case in which a white pattern VBE having a vertical bar shape is displayed at an edge portion of the display panel 100 of FIG. 1.

Referring to FIGS. 1 to 10B, the white patterns VBC and VBE have a great load so that the white patterns VBC and VBE may cause overheating and overcurrent. As shown in FIG. 10A, when the white pattern VBC having a vertical bar shape is displayed at a center portion of the display panel 100, the degree of overheating of the area where the white pattern VBC is displayed may be relatively little since black images are displayed on left and right sides of the white pattern VBC. In contrast, as shown in FIG. 10B, when the white pattern VBE having a vertical bar shape is displayed at an edge portion of the display panel 100, the degree of overheating of the area where the white pattern VBE is displayed may be relatively great since a black image is displayed only on one side of the white pattern VBE. In addition, since wirings or circuits are disposed in an area adjacent to the edge portion of the display panel 100, the edge portion of the display panel 100 may be more vulnerable to overheating.

Therefore, in an embodiment, a method of determining the second scale factor SF2 for a center display area corresponding to the center portion of the display panel 100 among the plurality of display areas and a method of determining the second scale factor SF2 for an edge display area corresponding to the edge portion of the display panel 100 among the plurality of display areas may be different from each other.

In an embodiment, a time duration of applying the second scale factor SF2, which is generated when an edge local load of the edge display area exceeds a threshold value, to the input image data IMG may be shorter than a time duration of applying the second scale factor SF2, which is generated when a center local load of the center display area exceeds the threshold value, to the input image data IMG, for example.

In an embodiment, when the second scale factor SF2 is determined to 0.7 and the grayscale value of the input image data IMG is 200, a target grayscale value of the input image data IMG may be 140, for example. The second scale factor SF2 may be gradually applied. In an embodiment, the grayscale value may be reduced by 1% per frame, for example. When the second scale factor SF2 of 0.7 (70%) is applied to the input image data IMG at a rate of 1% per frame, it may take 30 frames for the input image data IMG to have the target grayscale value.

In an embodiment, a speed of applying the second scale factor SF2, which is generated when the edge local load of the edge display area exceeds the threshold value, to the input image data IMG may be 1% per frame and a speed of applying the second scale factor SF2, which is generated when the center local load of the center display area exceeds the threshold value, to the input image data IMG may be 0.5% per frame, for example.

In contrast, the first scale factor SF1, which is generated based on the total load LD, may be immediately applied to the input image data IMG in an immediately subsequent frame. In an embodiment, when the first scale factor SF1 is determined to 0.7, the first scale factor SF1 of 0.7 may be applied to the input image data IMG in a frame immediately after the first scale factor SF1 is determined to 0.7, for example.

The case in which the total load LD exceeds its own threshold value may be more serious than the case in which the maximum local load exceeds its own threshold value so that the first scale factor SF1 generated based on the total load LD may be immediately applied but the second scale factor SF2 generated based on the maximum local loads may be gradually applied.

Figure 11A:
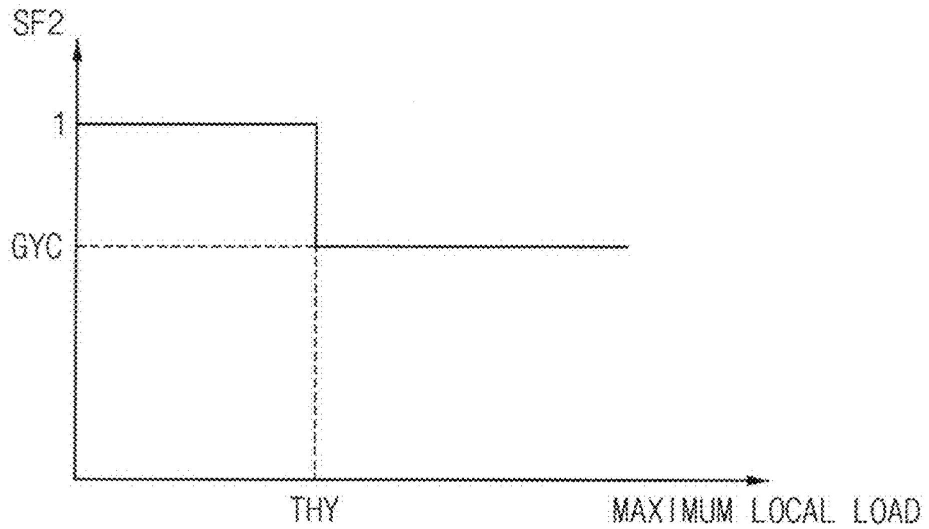
FIG. 11A is a graph illustrating an embodiment of an operation of the second scale factor determiner of FIG. 6 in the case in which the white pattern having the vertical bar shape is displayed at the center portion of the display panel of FIG. 1.
Figure 11B:
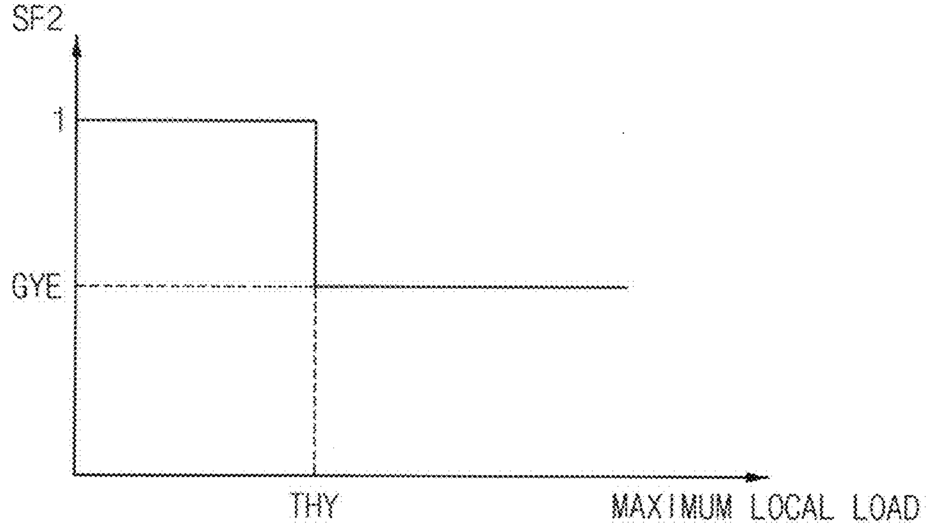
FIG. 11B is a graph illustrating an embodiment of an operation of the second scale factor determiner of FIG. 6 in the case in which the white pattern having the vertical bar shape is displayed at the edge portion of the display panel of FIG. 1.

FIG. 11A is a graph illustrating an embodiment of an operation of the second scale factor determiner 246 of FIG. 6 in the case in which the white pattern VBC having the vertical bar shape is displayed at the center portion of the display panel 100 of FIG. 1. FIG. 11B is a graph illustrating an embodiment of an operation of the second scale factor determiner 246 of FIG. 6 in the case in which the white pattern VBE having the vertical bar shape is displayed at the edge portion of the display panel 100 of FIG. 1.

Referring to FIGS. 1 to 11B, an edge scale factor GYE generated when the edge local load of the edge display area exceeds the threshold value THY may be less than a center scale factor GYC generated when the center local load of the center display area exceeds the threshold value THY. As explained above, the edge display area may be more vulnerable to overheating and overcurrent than the center display area so that the edge scale factor GYE may be set to be less than the center scale factor GYC and accordingly, a degree of reducing the grayscale value when the edge local load of the edge display area exceeds the threshold value THY may be greater than a degree of reducing the grayscale value when the center local load of the center display area exceeds the threshold value THY.

In an embodiment of FIGS. 11A and 11B, the second scale factor SF2 may be set based on one threshold value THY In an embodiment, when the center local load is equal to or less than the threshold value THY, the center scale factor (SF2 in FIG. 11A) may be one, for example. When the center local load is greater than the threshold value THY, the center scale factor (SF2 in FIG. 11A) may be determined to a first value GYC which is less than one.

In an embodiment, when the edge local load is equal to or less than the threshold value THY, the edge scale factor (SF2 in FIG. 11B) may be one, for example. When the edge local load is greater than the threshold value THY, the edge scale factor (SF2 in FIG. 11B) may be determined to a second value GYE which is less than the first value GYC.

Figure 12A:
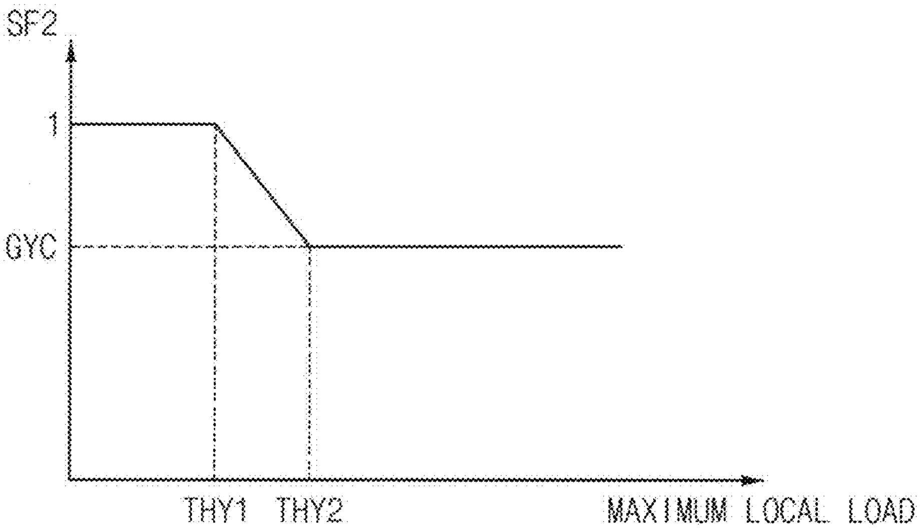
FIG. 12A is a graph illustrating an embodiment of an operation of the second scale factor determiner of FIG. 6 in the case in which the white pattern having the vertical bar shape is displayed at the center portion of the display panel of FIG. 1.
Figure 12B:
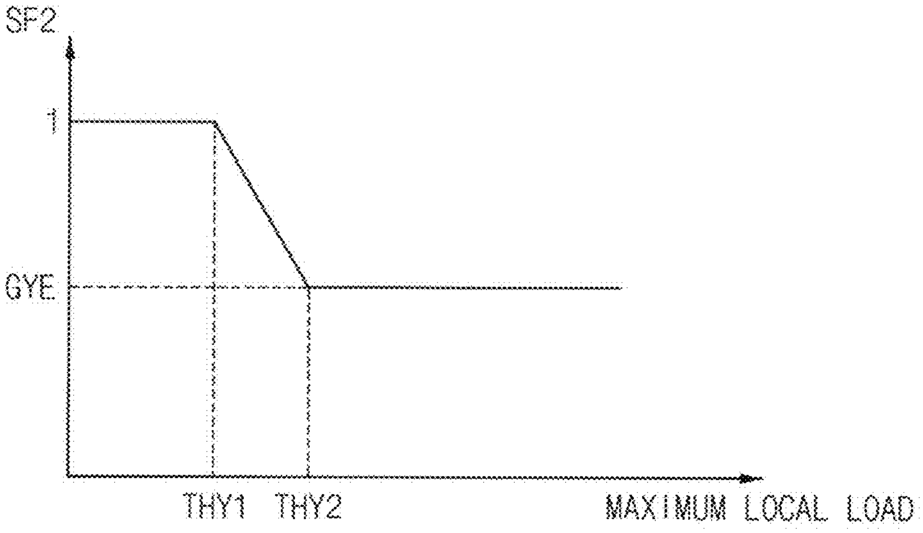
FIG. 12B is a graph illustrating an embodiment of an operation of the second scale factor determiner of FIG. 6 in the case in which the white pattern having the vertical bar shape is displayed at the edge portion of the display panel of FIG. 1.

FIG. 12A is a graph illustrating an embodiment of an operation of the second scale factor determiner 246 of FIG. 6 in the case in which the white pattern having the vertical bar shape VBC is displayed at the center portion of the display panel 100 of FIG. 1. FIG. 12B is a graph illustrating an embodiment of an operation of the second scale factor determiner 246 of FIG. 6 in the case in which the white pattern VBE having the vertical bar shape is displayed at the edge portion of the display panel 100 of FIG. 1.

In an embodiment of FIGS. 12A and 12B, the second scale factor SF2 may be set based on two threshold values THY1 and THY2.

In an embodiment, when the center local load is equal to or less than a first threshold value THY1, the center scale factor (SF2 in FIG. 12A) may be one, for example. When the center local load is greater than the first threshold value THY1 and equal to or less than a second threshold value THY2, the center scale factor (SF2 in FIG. 12A) may be determined to a value between one and a first value GYC. When the center local load is greater than the second threshold value THY2, the center scale factor (SF2 in FIG. 12A) may be determined to the first value GYC.

In an embodiment, when the edge local load is equal to or less than the first threshold value THY1, the edge scale factor (SF2 in FIG. 12B) may be one, for example. When the edge local load is greater than the first threshold value THY1 and equal to or less than a second threshold value THY2, the edge scale factor (SF2 in FIG. 12B) may be determined to a value between one and a second value GYE which is less than the first value GYC. When the edge local load is greater than the second threshold value THY2, the edge scale factor (SF2 in FIG. 12B) may be determined to the second value GYE.

Figure 13A:
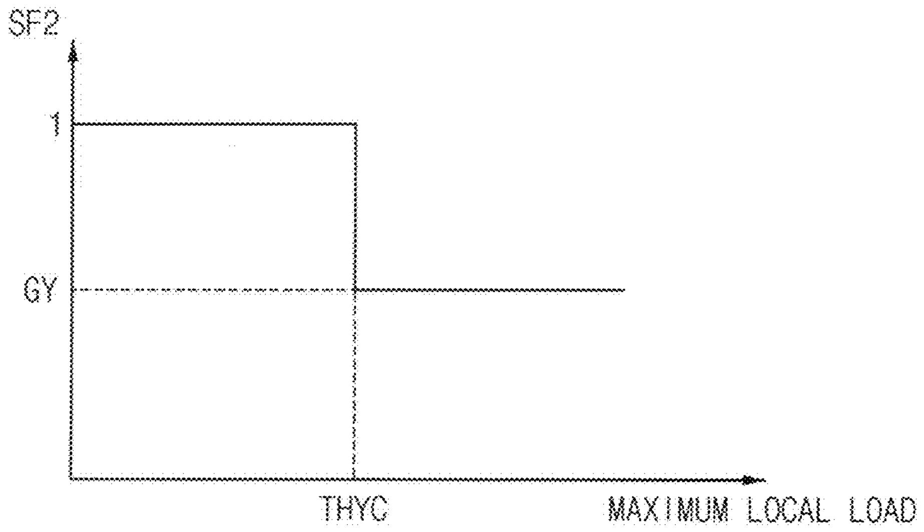
FIG. 13A is a graph illustrating an embodiment of an operation of the second scale factor determiner of FIG. 6 in the case in which the white pattern having the vertical bar shape is displayed at the center portion of the display panel of FIG. 1.
Figure 13B:
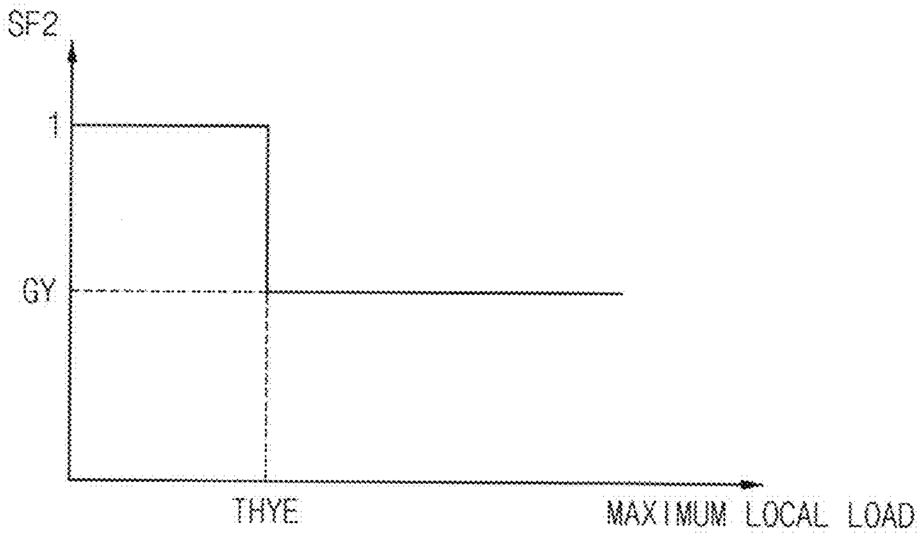
FIG. 13B is a graph illustrating an embodiment of an operation of the second scale factor determiner of FIG. 6 in the case in which the white pattern having the vertical bar shape is displayed at the edge portion of the display panel of FIG. 1.

FIG. 13A is a graph illustrating an embodiment of an operation of the second scale factor determiner 246 of FIG. 6 in the case in which the white pattern VBC having the vertical bar shape is displayed at the center portion of the display panel 100 of FIG. 1. FIG. 13B is a graph illustrating an embodiment of an operation of the second scale factor determiner 246 of FIG. 6 in the case in which the white pattern VBE having the vertical bar shape is displayed at the edge portion of the display panel 100 of FIG. 1.

Referring to FIGS. 1 to 10B, 13A and 13B, when the edge local load of the edge display area exceeds an edge threshold value THYE, an edge scale factor may be determined to be less than one. When the center local load of the center display area exceeds a center threshold value THYC, a center scale factor may be determined to be less than one. Herein, the edge threshold value THYE may be less than the center threshold value THYC. As explained above, the edge display area may be more vulnerable to overheating and overcurrent than the center display area so that the edge threshold value THYE may be set to be less than the center threshold value THYC, and accordingly, an grayscale range in which the grayscale value is reduced may be enlarged when the edge local load of the edge display area exceeds the edge threshold value THYE.

In an embodiment of FIGS. 13A and 13B, the center scale factor (SF2 in FIG. 13A) may be set based on one threshold value THYC and the edge scale factor (SF2 in FIG. 13B) may be set based on one threshold value THYE.

In an embodiment, when the center local load is equal to or less than the center threshold value THYC, the center scale factor (SF2 in FIG. 13A) may be one, for example. When the center local load is greater than the center threshold value THYC, the center scale factor (SF2 in FIG. 13A) may be determined to a first value GY which is less than one.

In an embodiment, when the edge local load is equal to or less than the edge threshold value THYE, the edge scale factor (SF2 in FIG. 13B) may be one, for example. When the edge local load is greater than the edge threshold value THYE, the edge scale factor (SF2 in FIG. 13B) may be determined to the first value GY.

Figure 14A:
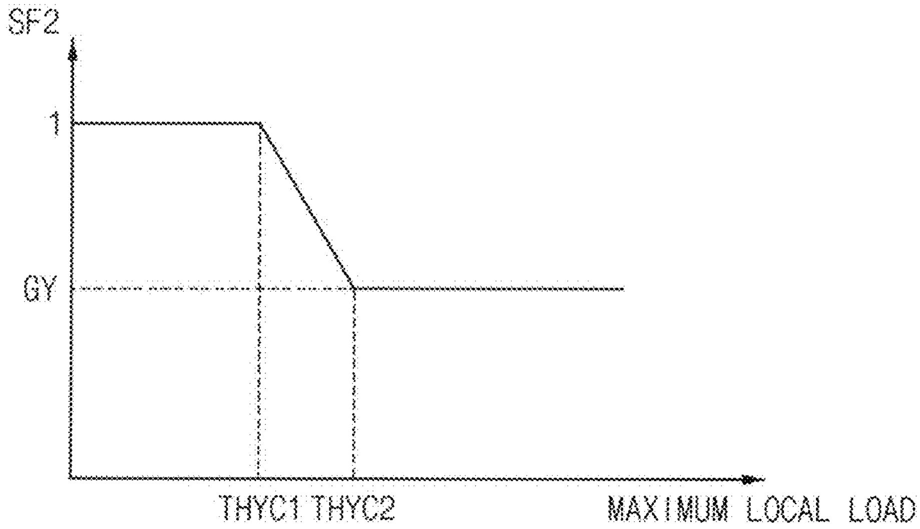
FIG. 14A is a graph illustrating an embodiment of an operation of the second scale factor determiner of FIG. 6 in the case in which the white pattern having the vertical bar shape is displayed at the center portion of the display panel of FIG. 1.
Figure 14B:
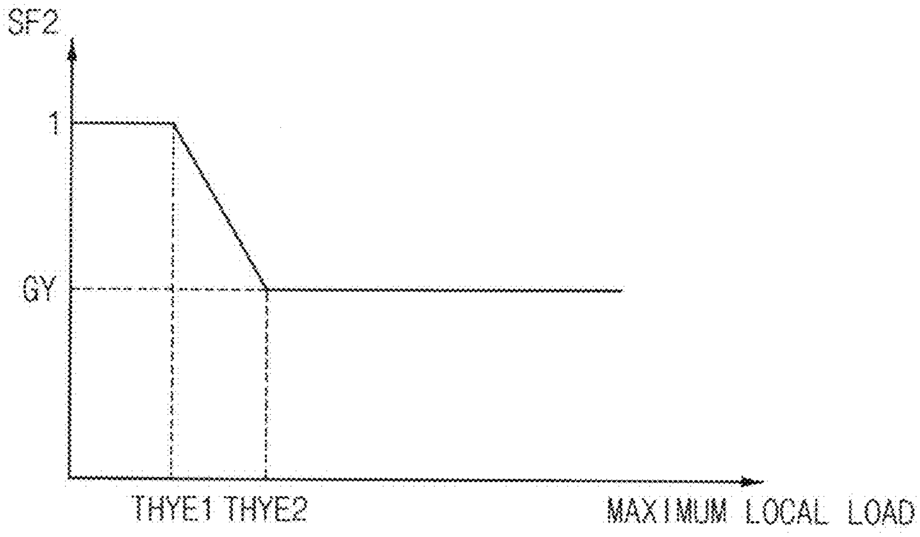
FIG. 14B is a graph illustrating an embodiment of an operation of the second scale factor determiner of FIG. 6 in the case in which the white pattern having the vertical bar shape is displayed at the edge portion of the display panel of FIG. 1.

FIG. 14A is a graph illustrating an embodiment of an operation of the second scale factor determiner 246 of FIG. 6 in the case in which the white pattern having the vertical bar shape VBC is displayed at the center portion of the display panel 100 of FIG. 1. FIG. 14B is a graph illustrating an embodiment of an operation of the second scale factor determiner 246 of FIG. 6 in the case in which the white pattern VBE having the vertical bar shape is displayed at the edge portion of the display panel 100 of FIG. 1.

In an embodiment of FIGS. 14A and 14B, the center scale factor (SF2 in FIG. 14A) may be set based on two threshold values THYC1 and THYC2 and the edge scale factor (SF2 in FIG. 14B) may be set based on two threshold values THYE1 and THYE2.

In an embodiment, when the center local load is equal to or less than a first center threshold value THYC1, the center scale factor (SF2 in FIG. 14A) may be one, for example. When the center local load is greater than the first center threshold value THYC1 and equal to or less than a second center threshold value THYC2, the center scale factor (SF2 in FIG. 14A) may be determined to a value between one and a first value GY. When the center local load is greater than the second center threshold value THYC2, the center scale factor (SF2 in FIG. 14A) may be determined to the first value GY.

In an embodiment, when the edge local load is equal to or less than the first edge threshold value THYE1, the edge scale factor (SF2 in FIG. 14B) may be one, for example. When the edge local load is greater than the first edge threshold value THYE1 and equal to or less than a second edge threshold value THYE2, the edge scale factor (SF2 in FIG. 14B) may be determined to a value between one and the first value GY. When the edge local load is greater than the second edge threshold value THYE2, the edge scale factor (SF2 in FIG. 14B) may be determined to the first value GY.

In an embodiment, the first edge threshold value THYE1 may be less than the first center threshold value THYC1, for example. In addition, the second edge threshold value THYE2 may be less than the second center threshold value THYC2.

Figure 15:
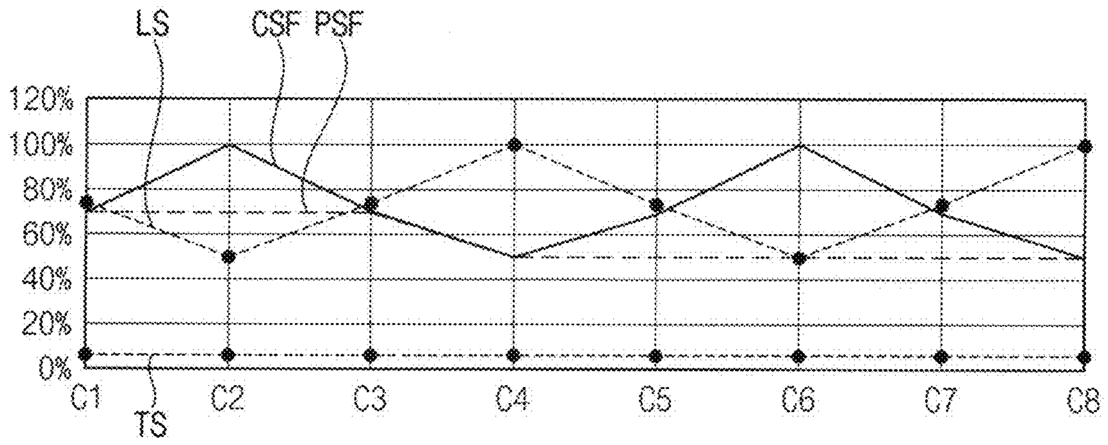
FIG. 15 is a graph illustrating an embodiment of an operation of the second scale factor determiner of FIG. 6.

FIG. 15 is a graph illustrating an embodiment of an operation of the second scale factor determiner 246 of FIG. 6.

Referring to FIGS. 1 to 15, when the local load (e.g. the maximum local load) changes from below an enter threshold value to above the enter threshold value, the display apparatus may enter a local net power operation. When the local load (e.g. the maximum local load) changes from above an exit threshold value to below the exit threshold value, the display apparatus may exit the local net power operation.

In the illustrated embodiment, the enter threshold value may be set differently from the exit threshold value. When the enter threshold value and the exit threshold value are the same, entry and exit of the local net power operation may occur repeatedly at a boundary of the enter threshold value (=the exit threshold value). When entry and exit of the local net power operation occur repeatedly, the luminance of the image may repeat increasing and decreasing so that a screen buzzing or a flicker may be shown to a user. When the enter threshold value is set to be greater than the exit threshold value, exit of the local net power operation may not occur frequently after entry of the local net power operation. In addition, in the illustrated embodiment, the second scale factor SF2 may be set to maintain or decrease without increasing until the exit of the local net power operation.

In FIG. 15, a reference character TS represents the total load, a reference character LS represents the maximum local load, a reference character CSF represents the second scale factor when the entry and exit of the local net power operation repeatedly occur because the enter threshold value and the exit threshold value are set to be the same, and a reference character PSF represents the second scale factor when the entry and exit of the local net power operation does not repeatedly occur because the enter threshold value is set to be greater than the exit threshold value.

A reference character C1 illustrates a case in which a white pattern having a vertical bar shape is displayed in 70% of a first display area and the white pattern is displayed in 30% of a second display area and other display areas display black images. Herein, the total load TS may be less than a threshold value. Herein, the maximum local load may be 70%. In this case, the second scale factor may be set to 0.7 to reduce the luminance of the display image regardless of whether the second scale factor corresponds to CSF or PSF.

A reference character C2 illustrates a case in which a white pattern having a vertical bar shape is displayed in 50% of a first display area and the white pattern is displayed in 50% of a second display area and other display areas display black images. Herein, the total load TS may be less than a threshold value. Herein, the maximum local load may be 50%. According to CSF in which the enter threshold value and the exit threshold value are the same, the display apparatus may exit the local net power operation and the second scale factor may be set to one. In contrast, according to PSF in which the enter threshold value is greater than the exit threshold value, the display apparatus may not exit the local net power operation and the second scale factor of 0.7 in C1 may be maintained.

A reference character C3 illustrates a case in which a white pattern having a vertical bar shape is displayed in 30% of a first display area and the white pattern is displayed in 70% of a second display area and other display areas display black images. Herein, the total load TS may be less than a threshold value. Herein, the maximum local load may be 70%. According to CSF in which the enter threshold value and the exit threshold value are the same, the display apparatus may enter the local net power operation again and the second scale factor may be set to 0.7. In contrast, according to PSF in which the enter threshold value is greater than the exit threshold value, the display apparatus may maintain the local net power operation and the second scale factor of 0.7 in C1 may be maintained.

A reference character C4 illustrates a case in which a white pattern having a vertical bar shape is displayed only in 100% of a second display area and other display areas display black images. Herein, the total load TS may be less than a threshold value. Herein, the maximum local load may be 100%. In this case, the second scale factor may be set to 0.5 to maximally reduce the luminance of the display image regardless of whether the second scale factor corresponds to CSF or PSF.

A reference character C5 illustrates a case in which a white pattern having a vertical bar shape is displayed in 70% of a second display area and the white pattern is displayed in 30% of a third display area and other display areas display black images. Herein, the total load TS may be less than a threshold value. Herein, the maximum local load may be 70%. According to CSF, the second scale factor may be increased again compared to the second scale factor of C4. In contrast, according to PSF, the second scale factor may be maintained as the second scale factor of C4.

As explained above, in the illustrated embodiment (PSF), the enter threshold value may be set to be greater than the exit threshold value, and the second scale factor SF2 may be set to maintain or decrease without increasing until the exit of the local net power operation. Thus, the local net power operation may be stably applied so that the display quality may be enhanced.

In an embodiment, the exit threshold value may be set to be equal to or less than a half of the enter threshold value, for example. When the exit threshold value is set to be equal to or less than a half of the enter threshold value, entry and exit of the local net power operation may not be repeated when the white pattern of the vertical bar shape having the same size of the single display area is gradually moved in the display panel 100 in a horizontal direction.

In the illustrated embodiment, the display panel 100 is divided into the plurality of display areas and the second scale factor SF2 is determined according to the local loads LD1 to LDN corresponding to the display areas. Thus, even when the input image data IMG include the locally bright portion, the overcurrent flowing in the data driver 500 or the display panel 100 may be prevented.

The method of determining the second scale factor SF2 for the center display area corresponding to the center of the display panel 100 may be different from the method of determining the second scale factor SF2 for the edge display area corresponding to the edge of the display panel 100 so that the edge display area and the data driving chip corresponding to the edge display area which are relatively likely to be overheated may be effectively protected.

Figure 16:
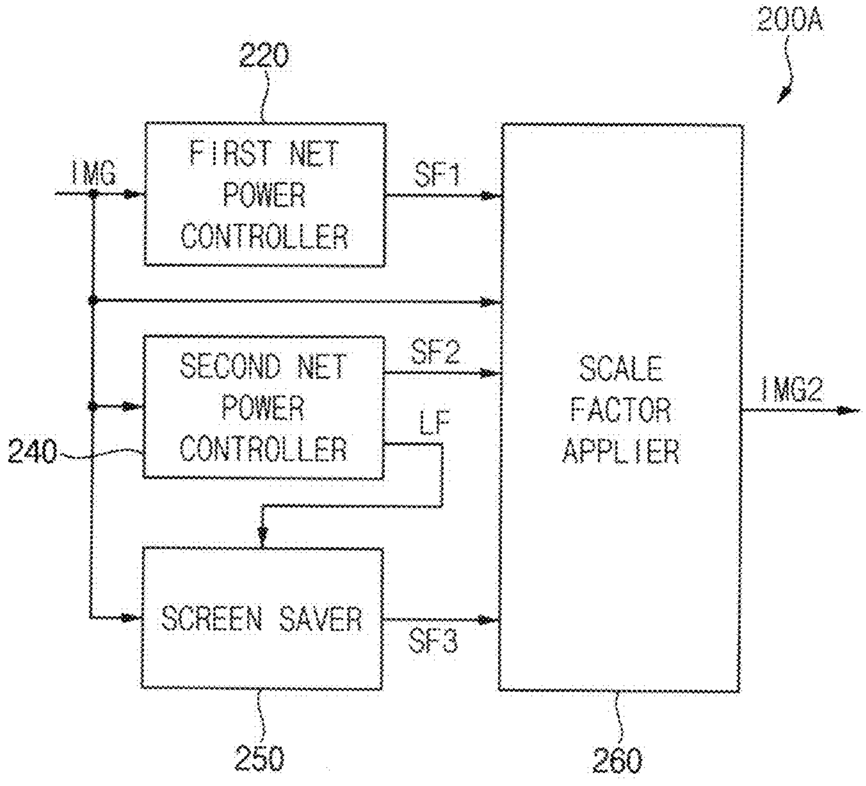
FIG. 16 is a block diagram illustrating an embodiment of a driving controller of a display apparatus according to the invention.

FIG. 16 is a block diagram illustrating an embodiment of a driving controller 200A of a display apparatus according to the invention.

The display apparatus and the method of driving the display panel in the illustrated embodiment is substantially the same as the display apparatus and the method of driving the display panel of the previous embodiment explained referring to FIGS. 1 to 15 except for the structure and the operation of the driving controller. Thus, the same reference numerals will be used to refer to the same or like parts as those described in the previous embodiment of FIGS. 1 to 15 and any repetitive explanation concerning the above elements will be omitted.

Referring to FIGS. 1 and 16, the display apparatus includes a display panel 100 and a display panel driver. The display panel driver includes a driving controller 200A, a gate driver 300, a gamma reference voltage generator 400 and a data driver 500.

The driving controller 200A may include a first net power controller 220, a second net power controller 240, a screen saver 250 and a scale factor applier 260.

The first net power controller 220 may determine a first scale factor SF1 based on a total load of the input image data IMG. The first net power controller 220 may output the first scale factor SF1 to the scale factor applier 260.

The second net power controller 240 may divide the input image data IMG into a plurality of partial image data corresponding to a plurality of display areas of the display panel 100, may calculate local loads corresponding to the plurality of partial image data and may determine a second scale factor SF2 based on the local loads. The second net power controller 240 may output the second scale factor SF2 to the scale factor applier 260.

The screen saver 250 may compare a previous frame image and a current frame image to determine whether the same image is repeated for a time duration equal to or greater than a predetermined threshold time duration. When the same image is repeated for the time duration equal to or greater than the predetermined threshold time duration, the screen saver 250 may generate a third scale factor SF3 for reducing the luminance of the input image data IMG. The third scale factor SF3 generated by the screen saver 250 may be gradually decreased as time passes. In an embodiment, the third scale factor SF3 generated by the screen saver 250 may be gradually decreased from 1 to 0.05 as time passes, for example.

The screen saver 250 may receive a local net power operation flag signal LF from the second net power controller 240. The local net power operation flag signal LF represents whether a local net power operation is being operated. When the local net power operation flag signal LF is activated, the screen saver 250 may generate the third scale factor SF3 which reduces the luminance of the input image data IMG earlier than an end time point of the predetermined threshold time duration. The screen saver 250 may output the third scale factor SF3 to the scale factor applier 260.

In an embodiment, when the predetermined threshold time duration is sixty seconds and the local net power operation flag signal LF is deactivated, the third scale factor SF3 for reducing the luminance of the input image data IMG may be generated when the same image is repeated for sixty seconds, for example. When the predetermined threshold time duration is sixty seconds and the local net power operation flag signal LF is activated, the third scale factor SF3 for reducing the luminance of the input image data IMG may be generated when the same image is repeated for thirty seconds.

The scale factor applier 260 may apply the first scale factor SF1, the second scale factor SF2 and the third scale factor SF3 to the input image data IMG to generate the luminance compensated data signal DATA.

In an embodiment, the scale factor applier 260 may apply a minimum value of the first scale factor SF1, the second scale factor SF2 and the third scale factor SF3 to the input image data IMG, for example.

In an alternative embodiment, the scale factor applier 260 may apply a multiplication of the first scale factor SF1, the second scale factor SF2 and the third scale factor SF3 to the input image data IMG.

In the illustrated embodiment, the display panel 100 is divided into the plurality of display areas and the second scale factor SF2 is determined according to the local loads LD1 to LDN corresponding to the display areas. Thus, even when the input image data IMG include the locally bright portion, the overcurrent flowing in the data driver 500 or the display panel 100 may be prevented.

The method of determining the second scale factor SF2 for the center display area corresponding to the center of the display panel 100 may be different from the method of determining the second scale factor SF2 for the edge display area corresponding to the edge of the display panel 100 so that the edge display area and the data driving chip corresponding to the edge display area which are relatively likely to be overheated may be effectively protected.

According to the display apparatus and the method of driving the display panel in the invention, the damage of the display panel and the data driver due to the overheating and the overcurrent may be prevented.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the particular embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display apparatus comprising:

a display panel;

a driving controller which divides input image data into a plurality of partial image data corresponding to a plurality of display areas of the display panel, calculates local loads corresponding to the plurality of partial image data, determines a scale factor based on the local loads, applies the scale factor to the input image data, and generates a data signal, the driving controller including:

a scale factor determiner which determines the scale factor based on a maximum value among the local loads; and a data driver which converts the data signal to a data voltage and outputs the data voltage to the display panel, wherein the scale factor for a center display area corresponding to a center of the display panel among the plurality of display areas is determined differently from the scale factor for an edge display area corresponding to an edge of the display panel among the plurality of display areas, wherein when an edge local load corresponding to the edge display area exceeds an edge threshold value, an edge scale factor is determined to be less than one, wherein when a center local load corresponding to the center display area exceeds a center threshold value, a center scale factor is determined to be less than one, and wherein the edge threshold value is less than the center threshold value.

2. The display apparatus of claim 1, wherein the driving controller further comprises:

an image divider which divides the input image data into the plurality of partial image data;

a local load calculator which calculates the local loads corresponding to the plurality of partial image data, and wherein the scale factor is applied to an entirety of the input image data.

3. The display apparatus of claim 1, wherein a time duration of applying the scale factor, which is generated when the edge local load of the edge display area exceeds a threshold value, to the input image data is shorter than a time duration of applying the scale factor, which is generated when the center local load of the center display area exceeds the threshold value, to the input image data.

4. The display apparatus of claim 1, wherein the edge scale factor, which is generated when the edge local load of the edge display area exceeds a threshold value, to the input image data is less than the center scale factor, which is generated when the center local load of the center display area exceeds the threshold value, to the input image data.

5. The display apparatus of claim 4, wherein when the center local load is equal to or less than the threshold value, the center scale factor is one, wherein when the center local load is greater than the threshold value, the center scale factor is a first value less than one, wherein when the edge local load is equal to or less than the threshold value, the edge scale factor is one, and wherein when the edge local load is greater than the threshold value, the edge scale factor is a second value less than the first value.

6. The display apparatus of claim 4, wherein when the center local load is equal to or less than a first threshold value, the center scale factor is one, wherein when the center local load is greater than the first threshold value and equal to or less than a second threshold value, the center scale factor is between one and a first value less than one, wherein when the center local load is greater than the second threshold value, the center scale factor is the first value, wherein when the edge local load is equal to or less than the first threshold value, the edge scale factor is one, wherein when the edge local load is greater than the first threshold value and equal to or less than the second threshold value, the edge scale factor is between one and a second value less than the first value, and wherein when the edge local load is greater than the second threshold value, the edge scale factor is the second value.

7. The display apparatus of claim 1, wherein when the center local load is equal to or less than the center threshold value, the center scale factor is one, wherein when the center local load is greater than the center threshold value, the center scale factor is a first value less than one, wherein when the edge local load is equal to or less than the edge threshold value, the edge scale factor is one, and wherein when the edge local load is greater than the edge threshold value, the edge scale factor is the first value.

8. The display apparatus of claim 1, wherein when the center local load is equal to or less than a first center threshold value, the center scale factor is one, wherein when the center local load is greater than the first center threshold value and equal to or less than a second center threshold value, the center scale factor is between one and a first value less than one, wherein when the center local load is greater than the second center threshold value, the center scale factor is the first value, wherein when the edge local load is equal to or less than a first edge threshold value, the edge scale factor is one, wherein when the edge local load is greater than the first edge threshold value and equal to or less than a second edge threshold value, the edge scale factor is between one and the first value, wherein when the edge local load is greater than the second edge threshold value, the edge scale factor is the first value, wherein the first edge threshold value is less than the first center threshold value, and wherein the second edge threshold value is less than the second center threshold value.

9. The display apparatus of claim 1, wherein when a local load of the local loads changes from below an enter threshold value to above the enter threshold value, the display apparatus enters a local net power operation, wherein when the local load changes from above an exit threshold value to below the exit threshold value, the display apparatus exits the local net power operation, and wherein the enter threshold value is different from the exit threshold value.

10. The display apparatus of claim 9, wherein the exit threshold value is equal to or less than a half of the enter threshold value.

11. A display apparatus comprising:

a display panel;

a driving controller which applies a first scale factor and a second scale factor to an input image data and generates a data signal, the driving controller comprising:

a first net power controller which determines the first scale factor based on a total load of input image data; and a second net power controller which divides the input image data into a plurality of partial image data corresponding to a plurality of display areas of the display panel, calculates local loads corresponding to the plurality of partial image data, and determines the second scale factor based on the local loads; and a data driver which converts the data signal to a data voltage and outputs the data voltage to the display panel.

12. The display apparatus of claim 11, wherein the first net power controller comprises:

a first load calculator which calculates the total load of the input image data; and a first scale factor determiner which determines the first scale factor based on the total load.

13. The display apparatus of claim 12, wherein the second net power controller comprises:

an image divider which divides the input image data into the plurality of partial image data;

a local load calculator which calculates the local loads corresponding to the plurality of partial image data; and a second scale factor determiner which determines the second scale factor based on a maximum value among the local loads.

14. The display apparatus of claim 11, wherein the driving controller applies a minimum value of the first scale factor and the second scale factor to the input image data.

15. The display apparatus of claim 11, wherein the driving controller applies a multiplication of the first scale factor and the second scale factor to the input image data.

16. The display apparatus of claim 11, wherein the driving controller further comprises a screen saver which compares a previous frame image and a current frame image to determine whether a same image is repeated for a time duration equal to or greater than a predetermined threshold time duration, and generates a third scale factor for reducing a luminance of the input image data when the same image is repeated for the time duration equal to or greater than the predetermined threshold time duration.

17. The display apparatus of claim 16, wherein the screen saver receives a local net power operation flag signal from the second net power controller, and wherein when the local net power operation flag signal is activated, the screen saver generates the third scale factor which reduces the luminance of the input image data earlier than an end time point of the predetermined threshold time duration.

18. A method of driving a display panel, the method comprising:

determining a first scale factor based on a total load of input image data;

dividing the input image data into a plurality of partial image data corresponding to a plurality of display areas of a display panel;

calculating local loads corresponding to the plurality of partial image data;

determining a second scale factor based on the local loads;

applying the first scale factor and the second scale factor to the input image data to generate a data signal;

converting the data signal to a data voltage; and outputting the data voltage to the display panel.

19. The method of claim 18, wherein the second scale factor is generated based on a maximum value among the local loads.

20. The method of claim 18, wherein further comprising:

comparing a previous frame image and a current frame image to determine whether a same image is repeated for a time duration equal to or greater than a predetermined threshold time duration; and generating a third scale factor for reducing a luminance of the input image data when the same image is repeated for the time duration equal to or greater than the predetermined threshold time duration.

21. The method of claim 18, wherein an operation of the determining the second scale factor for a center display area corresponding to a center of the display panel among the plurality of display areas is different from an operation of the determining the second scale factor for an edge display area corresponding to an edge of the display panel among the plurality of display areas.

* * * * *